United States Patent
Bhimanaik (10) Patent No.: US 10,785,201 B2
(45) Date of Patent: Sep. 22, 2020

(54) SYNCHRONIZING AUTHENTICATION SESSIONS BETWEEN APPLICATIONS

(71) Applicant: Amazon Technologies, Inc., Seattle, WA (US)

(72) Inventor: Bharath Kumar Bhimanaik, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 191 days.

(21) Appl. No.: 15/962,309

(22) Filed: Apr. 25, 2018

(65) Prior Publication Data

US 2018/0241734 A1  Aug. 23, 2018

Related U.S. Application Data

(60) Division of application No. 14/817,846, filed on Aug. 4, 2015, now Pat. No. 9,979,712, which is a continuation of application No. 14/023,840, filed on Sep. 11, 2013, now Pat. No. 9,106,642.

(51) Int. Cl.
*H04L 29/06* (2006.01)
*G06F 21/33* (2013.01)
*G06F 21/41* (2013.01)

(52) U.S. Cl.
CPC ............ *H04L 63/08* (2013.01); *G06F 21/335* (2013.01); *G06F 21/41* (2013.01); *H04L 63/0807* (2013.01); *H04L 63/0815* (2013.01); *H04L 63/102* (2013.01)

(58) Field of Classification Search
None
See application file for complete search history.

(56) References Cited

U.S. PATENT DOCUMENTS

| | | |
|---|---|---|
| 7,103,912 B2 | 9/2006 | Xia et al. |
| 7,461,249 B1 | 12/2008 | Pearson et al. |
| 7,818,582 B2 | 10/2010 | Marion et al. |
| 8,051,491 B1 | 11/2011 | Cavage et al. |
| 8,108,922 B2 | 1/2012 | Sirota |
| 8,544,072 B1 | 9/2013 | Masone et al. |
| 8,571,535 B1 | 10/2013 | Lin et al. |
| 8,572,268 B2 | 10/2013 | Wray |

(Continued)

FOREIGN PATENT DOCUMENTS

EP   2765529 A1 *  8/2014  ........... G06F 21/608

OTHER PUBLICATIONS

U.S. Appl. No. 14/023,663, filed Sep. 11, 2013, Non-Final Office Action dated Dec. 18, 2014.

(Continued)

*Primary Examiner* — Piotr Poltorak
(74) *Attorney, Agent, or Firm* — Thomas | Horstemeyer, LLP (57) ABSTRACT

Disclosed are various embodiments for synchronizing authentication sessions between applications. A token exchange service receives a first authentication token from a client computing device. The first authentication token corresponds to a registration of an application of the client computing device for a user account. The first authentication token is validated. A second authentication token is generated, corresponding to a browser-based session for the user account. The second authentication token is sent to the client computing device.

20 Claims, 7 Drawing Sheets

(56) References Cited

U.S. PATENT DOCUMENTS

| | | | |
|---|---|---|---|
| 8,607,306 B1 | 12/2013 | Bridge et al. | |
| 8,688,524 B1 | 4/2014 | Ramalingam et al. | |
| 8,793,509 B1* | 7/2014 | Nelson | G06F 21/335 380/227 |
| 8,832,787 B1* | 9/2014 | Sanin | G06F 21/41 726/2 |
| 8,869,253 B2* | 10/2014 | Atkinson | G06F 21/42 726/7 |
| 8,935,762 B2* | 1/2015 | Moas | G06F 21/34 380/44 |
| 8,955,084 B2* | 2/2015 | Do | G06F 21/33 726/9 |
| 8,997,189 B2 | 3/2015 | Erren et al. | |
| 9,183,361 B2* | 11/2015 | Obasanjo | H04L 63/0807 |
| 9,356,924 B1 | 5/2016 | Shahbazi et al. | |
| 9,363,251 B2 | 6/2016 | Morikuni et al. | |
| 9,369,457 B2 | 6/2016 | Grajek et al. | |
| 9,413,750 B2 | 8/2016 | Akula et al. | |
| 9,419,841 B1* | 8/2016 | Kozolchyk | H04L 9/3239 |
| 9,548,976 B2 | 1/2017 | Belote et al. | |
| 9,792,425 B2 | 10/2017 | Stone | |
| 10,003,592 B2* | 6/2018 | Prakash | G06F 21/45 |
| 10,063,547 B2* | 8/2018 | Zhang | H04L 63/10 |
| 2003/0033193 A1* | 2/2003 | Holloway | G06Q 10/10 715/237 |
| 2003/0115267 A1 | 6/2003 | Hinton et al. | |
| 2003/0126441 A1* | 7/2003 | Laux | G06F 21/31 713/168 |
| 2003/0163733 A1 | 8/2003 | Barriga-Caceres et al. | |
| 2003/0182551 A1 | 9/2003 | Frantz et al. | |
| 2004/0139352 A1 | 7/2004 | Shewchuk et al. | |
| 2008/0077791 A1 | 3/2008 | Lund et al. | |
| 2008/0115153 A1* | 5/2008 | Brindle | G06Q 50/06 719/328 |
| 2008/0178272 A1 | 7/2008 | Gajjala et al. | |
| 2008/0189778 A1 | 8/2008 | Rowley | |
| 2009/0161871 A1* | 6/2009 | Chaudhry | H04L 9/32 380/270 |
| 2009/0199276 A1 | 8/2009 | Schneider | |
| 2009/0292927 A1* | 11/2009 | Wenzel | G06F 21/41 713/185 |
| 2011/0030047 A1* | 2/2011 | Gao | G06F 21/335 726/9 |
| 2011/0088087 A1 | 4/2011 | Kalbratt | |
| 2011/0302646 A1* | 12/2011 | Ronda | H04L 9/3213 726/9 |
| 2012/0110318 A1* | 5/2012 | Stone | H04L 9/3234 713/150 |
| 2012/0131326 A1* | 5/2012 | Lau | H04L 63/104 713/150 |
| 2012/0216268 A1* | 8/2012 | Kassaei | H04L 9/3234 726/9 |
| 2012/0331563 A1 | 12/2012 | Chaudhury et al. | |
| 2013/0041959 A1* | 2/2013 | Bengtsson | H04L 51/14 709/206 |
| 2013/0086210 A1 | 4/2013 | Yiu et al. | |
| 2013/0086656 A1 | 4/2013 | Paddon et al. | |
| 2013/0086669 A1* | 4/2013 | Sondhi | G06F 21/41 726/8 |
| 2013/0125226 A1* | 5/2013 | Shah | H04L 63/0815 726/7 |
| 2013/0139241 A1* | 5/2013 | Leeder | H04W 12/0608 726/9 |
| 2013/0269019 A1* | 10/2013 | Garmark | G06F 17/2247 726/9 |
| 2013/0297935 A1 | 11/2013 | Oswalt | |
| 2014/0013396 A1 | 1/2014 | Field-Eliot et al. | |
| 2014/0033291 A1* | 1/2014 | Liu | H04L 63/08 726/7 |
| 2014/0053227 A1 | 2/2014 | Ruppin et al. | |
| 2014/0082715 A1* | 3/2014 | Grajek | G06F 16/955 726/8 |
| 2014/0115724 A1* | 4/2014 | van Brandenburg | G06F 21/10 726/30 |
| 2014/0118545 A1* | 5/2014 | Iwasaki | G08B 13/19686 348/143 |
| 2014/0164776 A1 | 6/2014 | Hook et al. | |
| 2014/0189799 A1* | 7/2014 | Lu | H04L 63/08 726/4 |
| 2014/0215565 A1* | 7/2014 | Miyoshi | H04L 63/08 726/3 |
| 2014/0215587 A1* | 7/2014 | Burch | H04W 12/04 726/6 |
| 2014/0230023 A1* | 8/2014 | Parks | G06F 21/608 726/4 |
| 2014/0244585 A1* | 8/2014 | Sivasubramanian | G06F 16/21 707/639 |
| 2014/0245396 A1 | 8/2014 | Oberheide et al. | |
| 2014/0281548 A1* | 9/2014 | Boyer | H04L 63/10 713/171 |
| 2014/0282918 A1* | 9/2014 | Rothschild | H04L 63/0815 726/4 |
| 2014/0289119 A1* | 9/2014 | Brudnicki | G06Q 20/3226 705/44 |
| 2014/0331060 A1 | 11/2014 | Hayton | |
| 2014/0337955 A1 | 11/2014 | Mendelovich et al. | |
| 2014/0373099 A1* | 12/2014 | Durbha | H04L 63/10 726/4 |
| 2015/0012995 A1 | 1/2015 | Korat et al. | |
| 2015/0046997 A1 | 2/2015 | Gupta et al. | |
| 2015/0248673 A1* | 9/2015 | Almohri | G06Q 20/38215 705/39 |
| 2015/0381621 A1 | 12/2015 | Innes et al. | |

OTHER PUBLICATIONS

U.S. Appl. No. 14/023,663, filed Sep. 11, 2013, Response to Non-Final Office Action dated Dec. 18, 2014.

U.S. Appl. No. 14/023,663, filed Sep. 11, 2013, Notice of Allowance dated Dec. 18, 2014.

U.S. Appl. No. 14/023,840, filed Sep. 11, 2013, Notice of Allowance dated Apr. 7, 2014.

U.S. Appl. No. 14/817,846, filed Aug. 4, 2015, Restriction/Election dated Mar. 6, 2017.

U.S. Appl. No. 14/817,846, filed Aug. 4, 2015, Response to Restriction/Election dated Mar. 6, 2017.

U.S. Appl. No. 14/817,846, filed Aug. 4, 2015, Non-Final Office Action dated Jun. 2, 2017.

U.S. Appl. No. 14/817,846, filed Aug. 4, 2015, Response to Non-Final Office Action dated Jun. 2, 2017.

U.S. Appl. No. 14/817,846, filed Aug. 4, 2015, Notice of Allowance dated Jan. 22, 2018.

"Algorithmic Tamper-Proof (ATP) Security: Theoretical Foundations for Security Against Hardware Tampering"—Gennaro et al, Bown Univ., Columbia Univ., Apr. 2004.

* cited by examiner

SYNCHRONIZING AUTHENTICATION SESSIONS BETWEEN APPLICATIONS

CROSS-REFERENCE TO RELATED APPLICATIONS

This application is a division of, and claims priority to, co-pending U.S. Patent Application entitled "SYNCHRONIZING AUTHENTICATION SESSIONS BETWEEN APPLICATIONS," filed on Aug. 4, 2015, and assigned application Ser. No. 14/817,846, which is a continuation of, and claims priority to, U.S. Patent Application entitled "SYNCHRONIZING AUTHENTICATION SESSIONS BETWEEN APPLICATIONS," filed on Sep. 11, 2013, assigned application Ser. No. 14/023,840, issued on Aug. 11, 2015, and assigned U.S. Pat. No. 9,106,642, which are incorporated herein by reference in their entireties.

BACKGROUND

When a user signs onto an account with a network site using a browser, a session is created. Typically, the user provides a username and a password to the network site, though other security credentials may be provided. Upon verification of the provided security credentials and creation of the session, one or more authentication tokens may be provided to the web browser to maintain the session state. Upon subsequent requests from the network site, the browser is configured to provide the authentication tokens via a cookie, form variables, or another approach. The authentication tokens may be valid until the user explicitly ends the session by logging out or until the expiration of a predefined period of time (e.g., 30 minutes, an hour, a day, or another time period).

In contrast to browser-based sessions, mobile applications and other dedicated applications may employ a registration approach. With a registration approach, after a user provides the username and password or other credentials, the application becomes registered with a network service. As with browser sessions, an authentication token may be created and supplied to the application by the network service. The application then is configured to automatically provide the authentication token in service calls to that service. Though the user may choose to explicitly deregister the application, registration otherwise may persist indefinitely.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to synchronizing authentication sessions between applications. Applications, such as mobile applications, can be classified as native applications, browser-based applications, or hybrid applications that blend the two. Native applications are dedicated applications that typically use a registration approach to authenticate with a network service. Browser-based applications employ a web-based interface for interacting with a network site. To this end, browser-based applications may include a container for launching a private instance of a browser to render the web-based interface. Browser-based applications typically use a short-lived session approach to authenticate with network sites. Hybrid applications may include native application code alongside a private browser for a web-based interface portion. The native portion may employ a registration approach, while the browser portion may employ a short-lived session approach.

Because hybrid applications may employ multiple authentication approaches, hybrid applications may require multiple sign-ons from users, even for network sites and services associated with a single user account. For example, a user may launch a hybrid application that requires the user to provide a username and password to register the application and access some functionality. However, when the user seeks to access other functionality that is browser-based, the user may be prompted to provide the username and password again to create a browser session with the network site, notwithstanding the earlier registration that may remain valid.

Various embodiments of the present disclosure facilitate a single-sign-on and a single-sign-out experience for applications using different approaches to authentication in a computing device. With the example of a hybrid application, a sign-on in the native portion may be used to bootstrap authentication in the browser portion via a token exchange approach. Similarly, a sign-on in the browser portion may be used to bootstrap authentication in the native portion via the token exchange approach. The authentication sessions may be synchronized on the client side such that expiration or log-out via one of the sessions causes the other session to expire.

Figure 1:
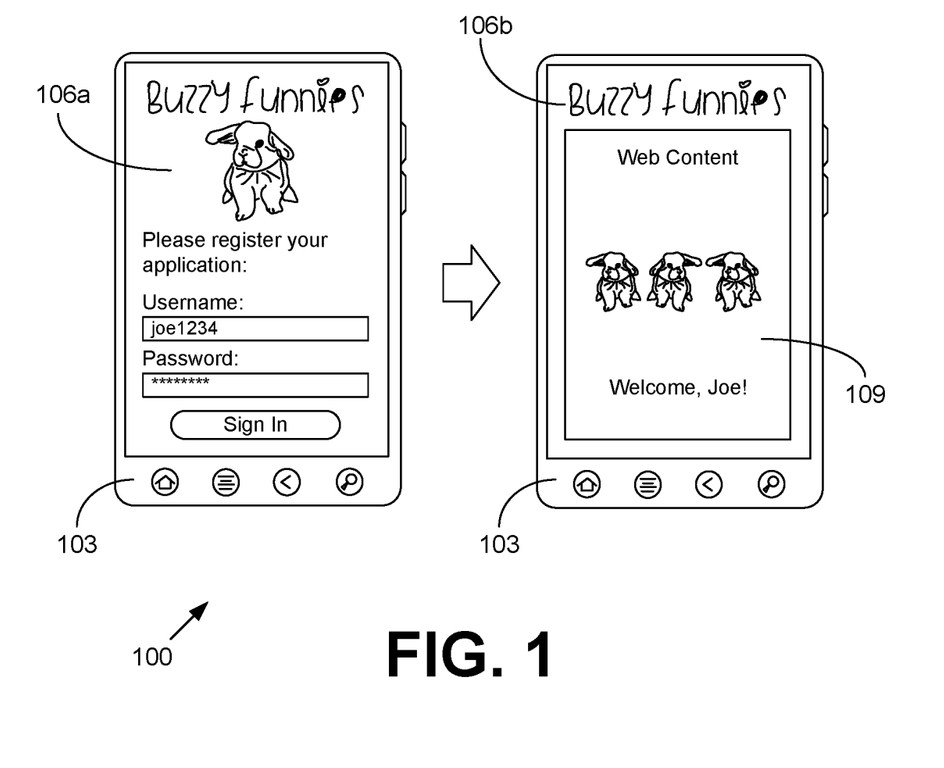
FIG. 1 is a drawing illustrating an example scenario involving synchronized authentication sessions according to an embodiment of the present disclosure.

With reference to FIG. 1, shown is an example scenario 100 involving synchronized authentication sessions according to an embodiment of the present disclosure. In the example scenario 100, a client computing device 103 first renders a user interface 106a generated by a native portion of a hybrid application named "Buzzy Funnies." The user interface 106a includes a sign-in portion that allows the user to enter various security credentials in order to "register" the application with a network service. In particular, the user interface 106a requests a username and a password from the user. In this example, the user has provided the username of "joe1234" and a password. The user can then select a sign-in button or another component in order to transmit the security credentials to an authentication service. The authentication service authenticates the client computing device 103 and returns an authentication token. The "Buzzy Funnies" application is subsequently configured to present the authentication token to the network service in order to access secured resources or perform secured operations.

Because the "Buzzy Funnies" application is a hybrid application, "Buzzy Funnies" includes a portion that corresponds to a web application. For example, some functionality or content in the "Buzzy Funnies" application corresponds to network page content rendered in a browser. The example scenario 100 includes a subsequent user interface 106b that has a browser-rendered portion 109 that shows some web content. According to an embodiment of the present disclosure, rather than seeing another sign-in screen in the browser-rendered portion 109, the authenticated user is greeted with "Welcome, Joe!" In this example, the user corresponding to "joe1234" is already authenticated within the browser via an exchanged authentication token as will be described. Although the example of a hybrid application has been discussed, it is understood the principles of the present disclosure may be applied to multiple distinct applications in a computing device to facilitate a single-sign-on experience among the applications. In the following discussion, a general description of the system and its components is provided, followed by a discussion of the operation of the same.

Figure 2:
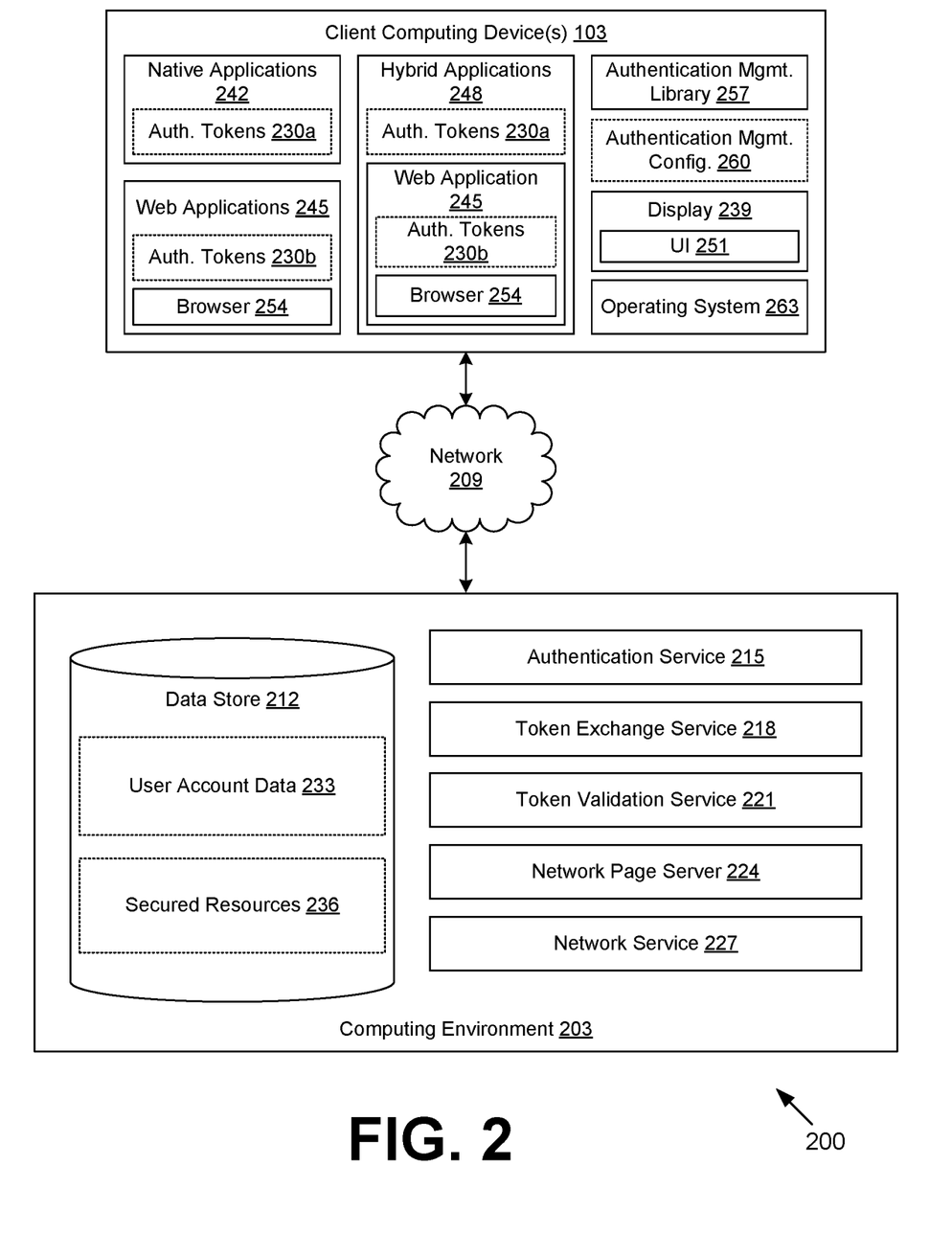
FIG. 2 is a drawing of a networked environment according to various embodiments of the present disclosure.

Turning now to FIG. 2, shown is a networked environment 200 according to various embodiments. The networked environment 200 includes a computing environment 203 in data communication with one or more client computing devices 103 via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, includes an authentication service 215, a token exchange service 218, a token validation service 221, a network page server 224, a network service 227, and other applications, services, processes, systems, engines, or functionality not discussed in detail herein. The authentication service 215 is executed to authenticate users in response to authentication requests. For example, a user may submit security credentials via a registration screen in a mobile application or via a sign-on network page. The authentication service 215 determines whether the security credentials validly correspond to a user account. If the security credentials are valid, the authentication service 215 issues an authentication token 230 that may be employed to access secured resources and/or perform secured operations relative to services provided by a service provider. The authentication token 230 may include information on who generated the token, an encrypted customer identifier, a level of permissions, and/or other data.

The token exchange service 218 is executed to exchange one type of authentication token 230 for another type of authentication token 230. For example, one type of authentication token 230 may pertain to browser-based sessions, while another type of authentication token 230 may pertain to registration sessions. An authentication token 230 used in a browser-based session may have a relatively short lifetime (e.g., 30 minutes, an hour, a day, etc.), while an authentication token 230 used in a registration session may have an indefinite lifetime (e.g., until explicitly revoked by the user or the service provider). In addition, the capabilities or levels of permissions associated with the different types of authentication tokens 230 may differ. As a non-limiting example, an authentication token 230b associated with a web application 245 might grant permissions to perform only certain operations associated with the user account, which might exclude changing an account password. By contrast, an authentication token 230a associated with a native application 242 may be able to perform all operations, including changing an account password. The different types of authentication tokens 230 may employ different formats and encompass different data in various embodiments.

The token validation service 221 may be executed to determine whether a particular authentication token 230 is valid. For example, the token validation service 221 may perform decryption, signature verification, and/or other operations to ensure that the authentication token 230 is valid. Further, where an authentication token 230 has an expiration time or can be revoked, the token validation service 221 may perform a verification that the authentication token 230 has not yet expired or has not yet been revoked.

The network page server 224 is executed to serve network pages, such as web pages and/or other forms of network content, to client computing devices 103 via the network 209. The network page server 224 may include a commercially available hypertext transfer protocol (HTTP) server such as Apache® HTTP Server, Apache® Tomcat®, Microsoft® Internet Information Services (IIS), and so on. Some of the network pages may be publicly accessible, while others of the network pages may be secured such that authentication of a client computing device 103 is a prerequisite for access.

The network service 227 corresponds to a web service or other service that receives requests and produces responses according to a service-oriented architecture. The network service 227 may utilize HTTP, simple object access protocol (SOAP), representational state transfer (REST), remote procedure call (RPC), remote method invocation (RMI), web services description language (WSDL), and/or other protocols and approaches. For example, a network service 227 may provide content for rendering within a screen of a mobile application or other dedicated application in the client computing device 103.

The network service 227 and the network page server 224 may be operated by the same service provider or a different service provider. In either case, both the network service 227 and the network page server 224 employ a shared user identity system such that a user may log-in with the same user account via the network page server 224 or the network service 227. The authentication service 215, the token exchange service 218, and the token validation service 221 may be operated by the same service provider as the network page server 224 and/or the network service 227. Alternatively, the authentication service 215, the token exchange service 218, and the token validation service 221 may be operated by a third-party identity provider.

The data stored in the data store 212 includes, for example, user account data 233, secured resources 236, and potentially other data. The user account data 233 includes various data relating to user accounts. Such data may include security credentials (e.g., usernames, passwords, hashes of usernames and/or passwords, public keys, private keys, etc.), information relating to active or expired authentication sessions, access restrictions and/or permissions for the user account, maximum lifetime of sessions associated with the user account, and/or other account information. The secured resources 236 comprise static content, dynamic content, and/or operations that are network accessible to authenticated client computing devices 103 via the network page server 224 and/or the network service 227.

The client computing device 103 is representative of a plurality of client computing devices 103 that may be coupled to the network 209. The client computing device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 103 may include a display 239. The display 239 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The client computing device 103 may be configured to execute various applications such as native applications 242, web applications 245, and hybrid applications 248. These applications may include social networking applications, email applications, mapping applications, contact manager applications, imaging applications, electronic book reader applications, music player applications, video player applications, and/or other types of applications. The native applications 242 are written in a native format for the platform of the client computing device 103 such that the native applications 242 render a native user interface (UI) 251 upon the display 239. The native applications 242 may be associated with authentication tokens 230a that facilitate access to secured resources 236 of the network page server 224 and/or the network service 227. In one embodiment, the authentication tokens 230a are registration tokens that may have an indefinite lifetime.

The web applications 245 are containers for web-based functionality, with a user interface 251 rendered on the display 239 by a private instance of a browser 254. Such user interfaces 251 may correspond to network pages that are customized for rendering on a mobile device or other platform specific to the client computing device 103. The containers employed for the web applications 245 may be standardized such that the primary functionality is merely to launch the private instance of the browser 254 to access a predetermined uniform resource locator (URL). A web application 245 may be associated with one or more authentication tokens 230b that facilitate access by the browser 254 to secured resources 236 of the network page server 224 and/or the network service 227. In one embodiment, the authentication tokens 230b may correspond to cookies stored in a cookie jar of the web application 245.

A hybrid application 248 mixes the functionality of a native application 242 with a web application 245. To this end, the native container of the hybrid application 248 may include some customized functionality, as with a native application 242. However, a hybrid application 248 also includes a web application 245 to provide at least some web-based functionality. Thus, a hybrid application 248 may be associated with registration authentication tokens 230a for use by the native container as well as browser-session authentication tokens 230b for use by the private instance of the browser 254.

The authentication management library 257 corresponds to the client-side code that implements synchronization of authentication sessions across applications. To this end, the authentication management library 257 may employ a stand-alone service in communication with various applications executed in the client computing device 103. Alternatively, or additionally, at least a portion of the authentication management library 257 may be included within or linked to various applications executed in the client computing device 103. The operation of the authentication management library 257 may be configured based at least in part on parameters stored within an authentication management configuration 260. For example, the authentication management configuration 260 may enumerate which applications are permitted or not permitted to participate in synchronized authentication sessions. Additionally, an operating system 263 may be executed in the client computing device 103.

Next, a general description of the operation of the various components of the networked environment 200 is provided. To begin, a user installs and/or configures a plurality of applications in the client computing device 103 which employ the authentication management library 257. For purposes of discussion herein, a hybrid application 248 may be considered to be a plurality of applications, namely, the native container of the hybrid application 248 and the web application 245, as both may employ different authentication tokens 230. The user establishes or has previously established an account with a service provider, thereby resulting in the creation of security credentials for the account.

At some point, the user enters the security credentials into a user interface 251 of an application. This may correspond to a registration process for a native application 242 or a hybrid application 248 or a sign-in process for a web application 245. Accordingly, the security credentials are provided to the authentication service 215, which generates and returns an authentication token 230. In some cases, the authentication token 230 is returned via the network page server 224 or the network service 227.

Subsequently, the user employs another application (or a web application 245 within a hybrid application 248) and the other application encounters a secured resource 236 for which authentication is a prerequisite. Both of these applications employ the authentication management library 257. The authentication management library 257 is configured to request a new authentication token 230 for the other application using the previous authentication token 230 of the first application. Consequently, the other application becomes authenticated and can access secured resources 236 of the network page server 224 and/or the network service 227 without having to prompt the user to enter the security credentials. The authentication management library 257 may be configured to synchronize these authentication sessions to provide a single log-out experience as well as to refresh authentication tokens 230 that expire while another authentication token 230 remains valid.

In order to facilitate sign-on detection, log-out detection, token expiration, token exchange, and/or other communication between applications, various techniques involving application signature validation and/or secure keys signed by a trusted source may be employed. On an untrusted platform, verifying the source of an application may be important to avoid communicating authentication tokens 230 to untrusted applications. Various approaches to secure communication between applications are described in U.S. Patent Application entitled "SECURE COMMUNICATION BETWEEN APPLICATIONS ON UNTRUSTED PLATFORMS," filed Sep. 11, 2013 under Ser. No. 14/023,663, which is incorporated herein by reference in its entirety.

Figure 3A:
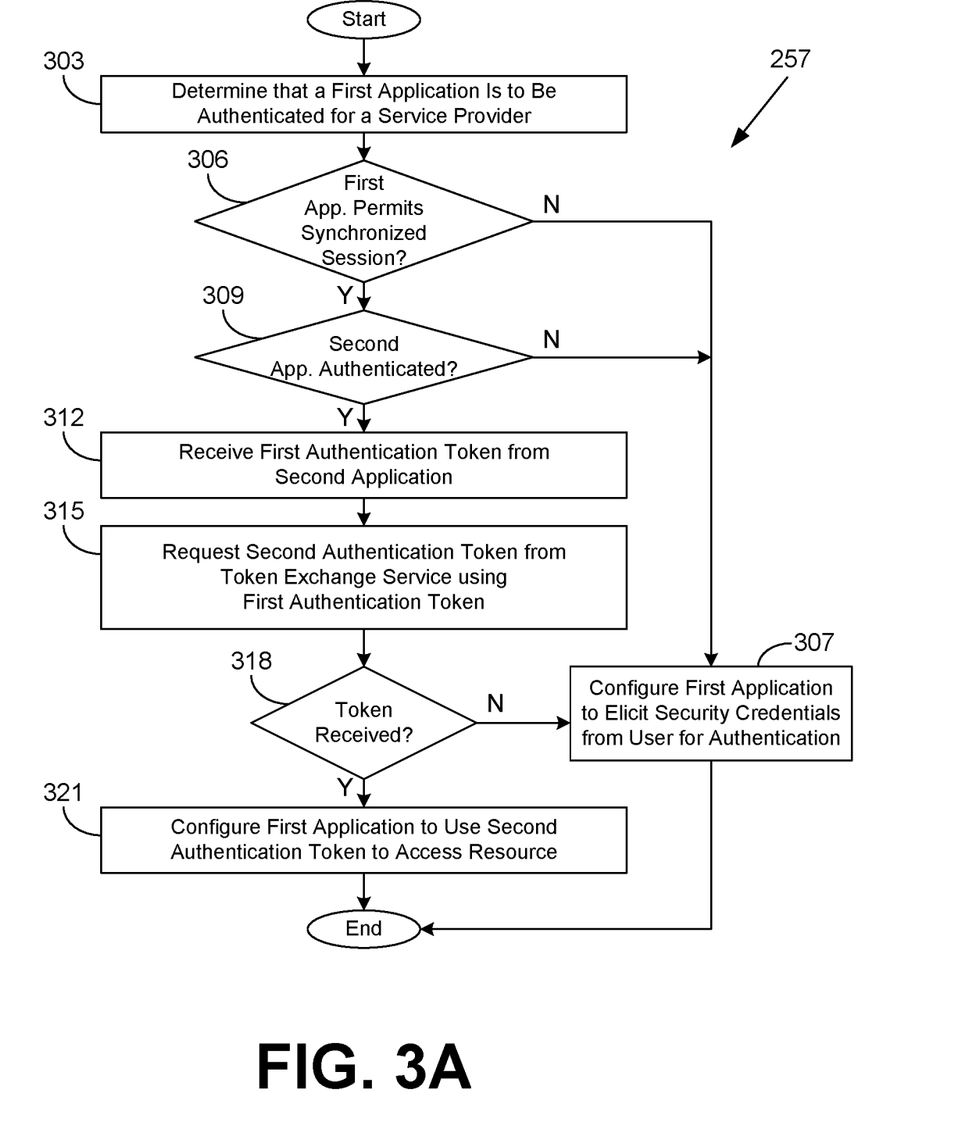
FIGS. 3A-3C are flowcharts illustrating examples of functionality implemented as portions of an authentication management library executed in a client computing device in the networked environment of FIG. 2 according to various embodiments of the present disclosure.

Referring next to FIG. 3A, shown is a flowchart that provides one example of the operation of a portion of the authentication management library 257 according to various embodiments. Specifically, the flowchart of FIG. 3A pertains to a bootstrapping procedure where a valid token for one application is used to obtain a valid token for another application, thereby implementing a single sign-on for the applications. The applications may be implemented in one or more client computing devices 103 (FIG. 2). It is understood that the flowchart of FIG. 3A provides merely an example of the many different types of functional arrangements that may be employed to implement the operation of the portion of the authentication management library 257 as described herein. As an alternative, the flowchart of FIG. 3A may be viewed as depicting an example of steps of a method implemented in at least one client computing device 103 according to one or more embodiments.

Beginning with box 303, the authentication management library 257 determines that a first application is to be authenticated for a service provider. For example, a native application 242 (FIG. 2) or a hybrid application 248 (FIG. 2) may inform the authentication management library 257 that a sign-in user interface 251 (FIG. 2) is to be presented to the user, or otherwise, that security credentials for a user account are to be requested from the user. In the case of a web application 245 (FIG. 2) (either standalone or embedded in a hybrid application 248), a predetermined sign-in uniform resource locator (URL) may be intercepted. Alternatively, a network page obtained by the web application 245 may be analyzed to determine whether it elicits security credentials from the user.

In box 306, the authentication management library 257 determines whether the first application permits a synchronized session. For example, a hook in the authentication management library 257 may be present to allow the first application to determine whether to synchronize authentication. In some cases, the first application may desire not to synchronize authentication and instead prompt the user to supply security credentials. Such cases may be employed, for example, to ensure that the authenticated user still maintains control over the client computing device 103. If the first application does not permit a synchronized session, the authentication management library 257 continues to box 307.

If, instead, the first application does permit a synchronized session, the authentication management library 257 moves from box 306 to box 309. In box 309, the authentication management library 257 determines whether a second application accessible to the authentication management library 257 is authenticated for the same user account for which the first application is to be authenticated. If a second application is not authenticated, the authentication management library 257 proceeds to box 307.

If, instead, a second application accessible to the authentication management library 257 is authenticated, the authentication management library 257 proceeds from box 309 to box 312. In box 312, the authentication management library 257 receives a first authentication token 230 (FIG. 2) from the second application. Where the second application is a web application 245, the authentication management library 257 may read the first authentication token 230 from a cookie jar associated with the web application 245. Where the second application is a native application 242 or a hybrid application 248, the authentication management library 257 may employ an application programming interface (API) call to retrieve the first authentication token 230. In some embodiments where applications are sandboxed, a special service that facilitates secure inter-process communication may be employed to retrieve and/or exchange authentication tokens 230.

In box 315, the authentication management library 257 requests a second authentication token 230 from a token exchange service 218 (FIG. 2) via a network 209 (FIG. 2). The request may specify a desired format for the second authentication token 230, where the desired format is usable by the first application. For example, where the first application is a web application 245, the desired format may be a browser-based session format with a predetermined maximum lifetime. Where the first application is a native application 242 or a hybrid application 248, the desired format may be a registration session format with an indefinite maximum lifetime.

In box 318, the authentication management library 257 determines whether the requested second authentication token 230 has been received from the token exchange service 218. For example, the request may fail due to an invalid token, lack of permissions, revoked access, and/or other reasons. If the second authentication token 230 is not received, the authentication management library 257 proceeds to box 307.

If, instead, the second authentication token 230 is received, the authentication management library 257 transitions from box 318 to box 321. In box 321, the authentication management library 257 configures the first application to use the second authentication token 230 to access resources of the network service 227 (FIG. 2) and/or the network page server 224 (FIG. 2). For example, the authentication management library 257 may store a cookie containing the second authentication token 230 in a cookie jar of a web application 245. In one embodiment, the cookie may be generated by the authentication management library 257. In another example, the authentication management library 257 may provide the second authentication token 230 to a native application 242 and/or a hybrid application 248 via an API call.

The authentication management library 257 may cause the application to proceed with accessing a secured resource 236 (FIG. 2) for which authentication is a prerequisite. In one embodiment, where a sign-on URL is intercepted, the authentication management library 257 may configure a web application 245 to proceed automatically to a destination URL of the sign-on URL, e.g., a URL that is to be accessed after the user has been authenticated. Thus, the sign-on URL may be entirely bypassed. Thereafter, the portion of the authentication management library 257 ends.

In box 307, synchronized sessions are not currently available, so the authentication management library 257 configures the first application to elicit security credentials from the user for authentication. For example, the first application may be permitted to render a sign-on user interface 251 (FIG. 2) that elicits a username, a password, and/or other security credentials from the user. Thereafter, the portion of the authentication management library 257 ends. An authentication token 230 may subsequently be received from an authentication service 215 (FIG. 2) and may be used in synchronizing sessions of other applications executed in the client computing device 103 in some cases.

Figure 3B:
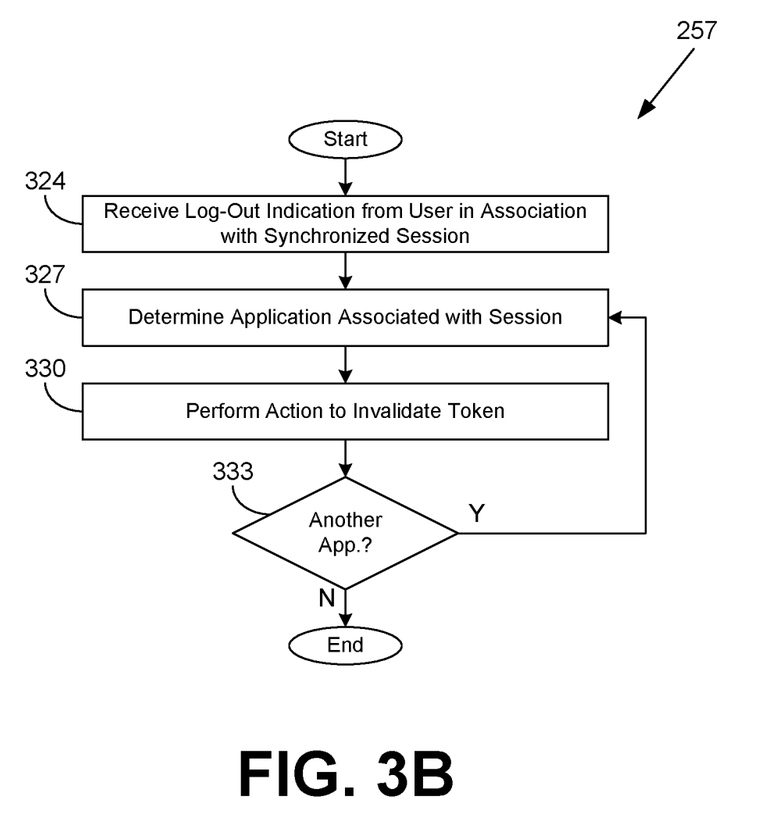

Moving on to FIG. 3B, shown is a flowchart that provides one example of the operation of another portion of the authentication management library 257 according to various embodiments. In particular, the flowchart of FIG. 3B pertains to a log-out procedure whereby multiple applications are logged out via a single log-out request. The applications may be implemented in one or more client computing devices 103. It is understood that the flowchart of FIG. 3B provides merely an example of the many different types of functional arrangements that may be employed to implement the operation of the other portion of the authentication management library 257 as described herein. As an alternative, the flowchart of FIG. 3B may be viewed as depicting an example of steps of a method implemented in at least one client computing device 103 (FIG. 2) according to one or more embodiments.

Beginning with box 324, the authentication management library 257 receives a log-out indication from a user in association with a synchronized authentication session. For example, the authentication management library 257 may detect that a user has selected a log-out component in a user interface 251 (FIG. 2) rendered by a native application 242 (FIG. 2) or a hybrid application 248 (FIG. 2). In the case of a web application 245, the authentication management library 257 may intercept an access by a browser 254 (FIG. 2) of a predetermined uniform resource locator (URL) that is associated with a log-out operation.

In box 327, the authentication management library 257 determines an application that is associated with the synchronized authentication session. In box 330, the authentication management library 257 performs one or more actions to invalidate the authentication token 230 (FIG. 2) corresponding to the application. For example, the authentication management library 257 may communicate the authentication token 230 to the token validation service 221 (FIG. 2) in a request that the authentication token 230 be invalidated or revoked. The authentication management library 257 may remove the authentication token 230 from a cookie jar of the application and/or may send an invalidation indication to the application via an application programming interface (API) call. In one embodiment, the application may be configured to send a log-out request or token invalidation request to the token validation service 221 in response to receiving a message from the authentication management library 257.

In box 333, the authentication management library 257 determines whether another application is participating in the synchronized application session. If another application is participating, the authentication management library 257 returns to box 327 and determines the other application. If another application is not participating, the portion of the authentication management library 257 ends.

Figure 3C:
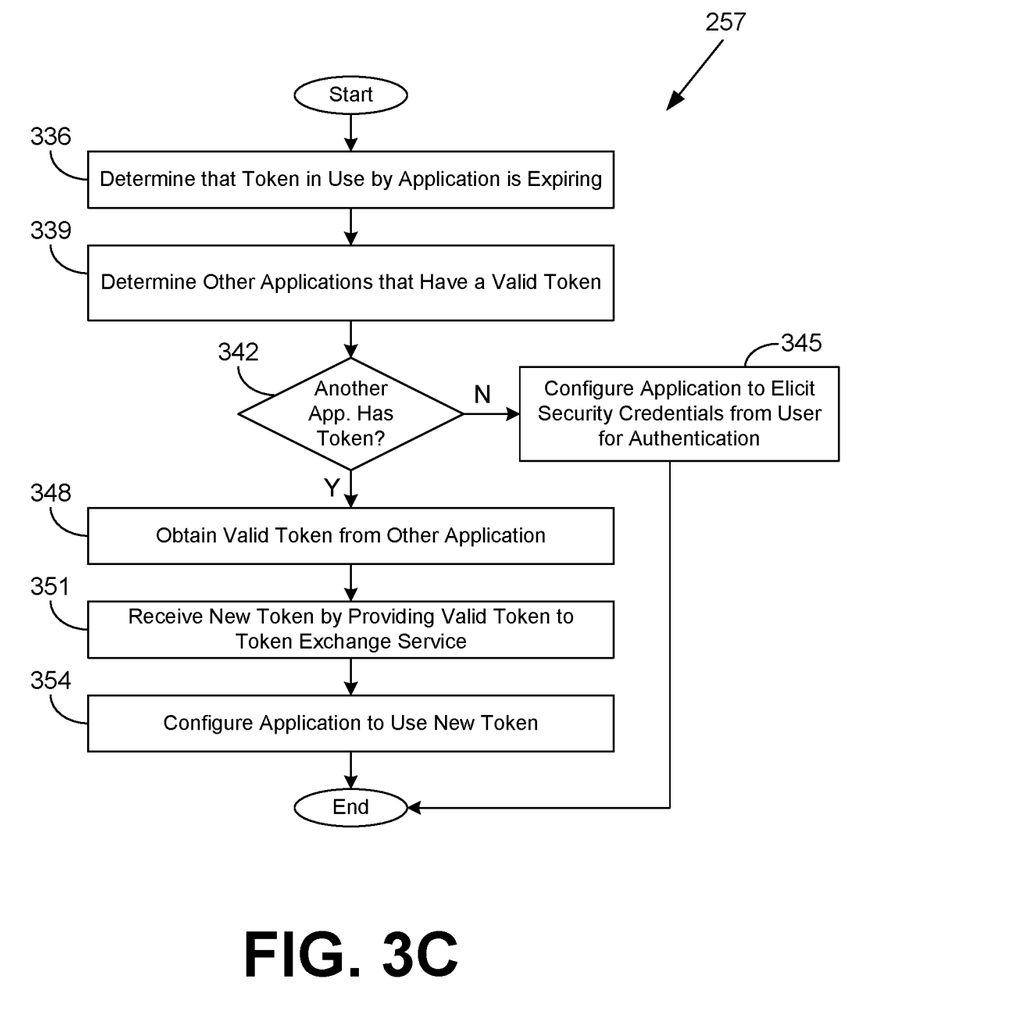

Continuing to FIG. 3C, shown is a flowchart that provides one example of the operation of yet another portion of the authentication management library 257 according to various embodiments. Specifically, the flowchart of FIG. 3C pertains to a token refresh procedure used to refresh tokens that are expiring. It is understood that the flowchart of FIG. 3C provides merely an example of the many different types of functional arrangements that may be employed to implement the operation of the other portion of the authentication management library 257 as described herein. As an alternative, the flowchart of FIG. 3C may be viewed as depicting an example of steps of a method implemented in at least one client computing device 103 (FIG. 2) according to one or more embodiments.

Beginning with box 336, the authentication management library 257 determines that an authentication token 230 (FIG. 2) in use by an application is expiring or has been revoked. In one example, the authentication management library 257 may detect that a web application 245 (FIG. 2) has been redirected to a sign-in uniform resource locator (URL). In another example, the authentication management library 257 may detect that a native application 242 (FIG. 2) has received an expired token error or invalid token error in response to a service call. In box 339, the authentication management library 257 determines participating applications in the client computing device 103 that have a valid authentication token 230 for the particular synchronized authentication session.

In box 342, the authentication management library 257 determines whether another application has a valid authentication token 230. If another application does not have such a valid authentication token 230, the authentication management library 257 continues to box 345. In box 345, the authentication management library 257 configures the application having the expired or revoked authentication token 230 to elicit security credentials from the user for authentication. Thereafter, the portion of the authentication management library 257 ends.

If another application does have a valid authentication token 230, the authentication management library 257 continues from box 342 to box 348. In box 348, the authentication management library 257 obtains the valid authentication token 230 from the other application. In box 351, the authentication management library 257 receives a new authentication token 230 by providing the valid authentication token 230 to the token exchange service 218 (FIG. 2). In box 354, the authentication management library 257 configures the application to use the new authentication token 230 in place of the expired or revoked authentication token 230. It is noted that, in some cases, the application may choose to elicit security credentials from the user rather than to refresh an expired or revoked authentication token 230 via an automated process. Thereafter, the portion of the authentication management library 257 ends.

Figure 4:
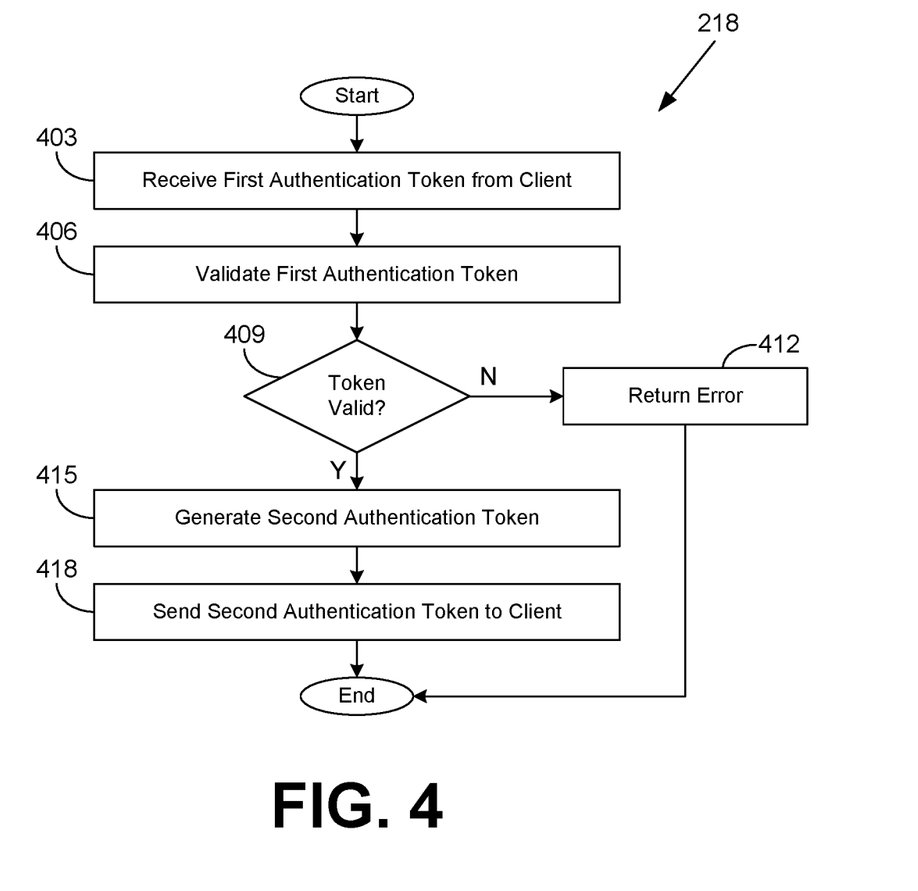
FIG. 4 is a flowchart illustrating one example of functionality implemented as portions of a token exchange service executed in a computing environment in the networked environment of FIG. 2 according to various embodiments of the present disclosure.

Turning now to FIG. 4, shown is a flowchart that provides one example of the operation of a portion of the token exchange service 218 according to various embodiments. It is understood that the flowchart of FIG. 4 provides merely an example of the many different types of functional arrangements that may be employed to implement the operation of the portion of the token exchange service 218 as described herein. As an alternative, the flowchart of FIG. 4 may be viewed as depicting an example of steps of a method implemented in the computing environment 203 (FIG. 2) according to one or more embodiments.

Beginning with box 403, the token exchange service 218 receives a first authentication token 230 (FIG. 2) in a token exchange request from a client computing device 103 (FIG. 2) via the network 209 (FIG. 2). The token exchange request may specify a desired format for a requested authentication token 230. In one example, the provided authentication token 230 is in a registration session token format, while the requested authentication token 230 is in a browser-based session token format. In some scenarios, the token exchange request may specify a particular level of permissions to be associated with the requested authentication token 230. For example, it may be desired to request fewer permissions for an authentication token 230 associated with a web application 245 (FIG. 2) as compared to a native application 242 (FIG. 2).

In box 406, the token exchange service 218 performs a validation on the first authentication token 230. For example, the token exchange service 218 may call the token validation service 221 (FIG. 2) to validate the first authentication token 230. In various embodiments, the first authentication token 230 may be decrypted and/or a signature of the first authentication token 230 may be verified. The first authentication token 230 may be examined to ensure that it corresponds to a correct customer identifier (which may be encrypted within the token) and/or has not expired or been revoked. In embodiments where identity federation is employed, the token validation service 221 may be operated by a different organization that is trusted by the organization that issues the authentication tokens 230 vended by the token exchange service 218. In box 409, the token exchange service 218 determines whether the first authentication token 230 is valid. If the first authentication token 230 is determined not to be valid, the token exchange service 218 returns an error in box 412. Thereafter, the portion of the token exchange service 218 ends.

If, instead, the first authentication token 230 is valid, the token exchange service 218 continues from box 409 to box 415. In box 415, the token exchange service 218 generates a second authentication token 230. For example, the second authentication token 230 may be generated in a format requested in the token exchange request. In some embodiments, the token exchange service 218 may obtain the second authentication token 230 from a trusted service operated by another organization that issues the second authentication token 230. In box 418, the token exchange service 218 sends the second authentication token 230 to the client computing device 103 via the network 209 (FIG. 2). Thereafter, the portion of the token exchange service 218 ends.

Figure 5:
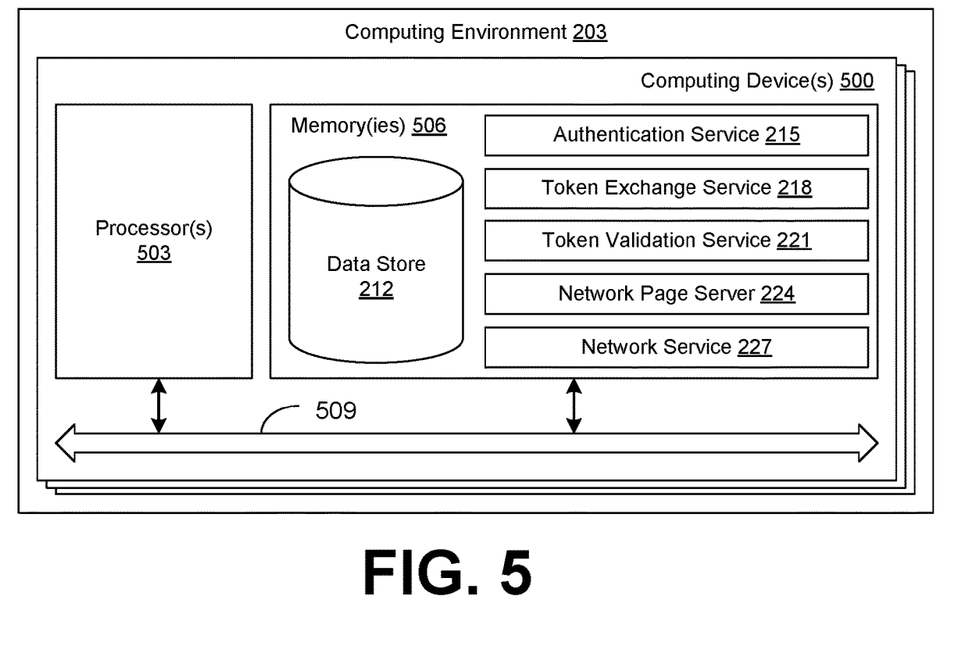
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the authentication service 215, the token exchange service 218, the token validation service 221, the network page server 224, the network service 227, and potentially other applications. Also stored in the memory 506 may be a data store 212 and other data. In addition, an operating system may be stored in the memory 506 and executable by the processor 503.

Figure 6:
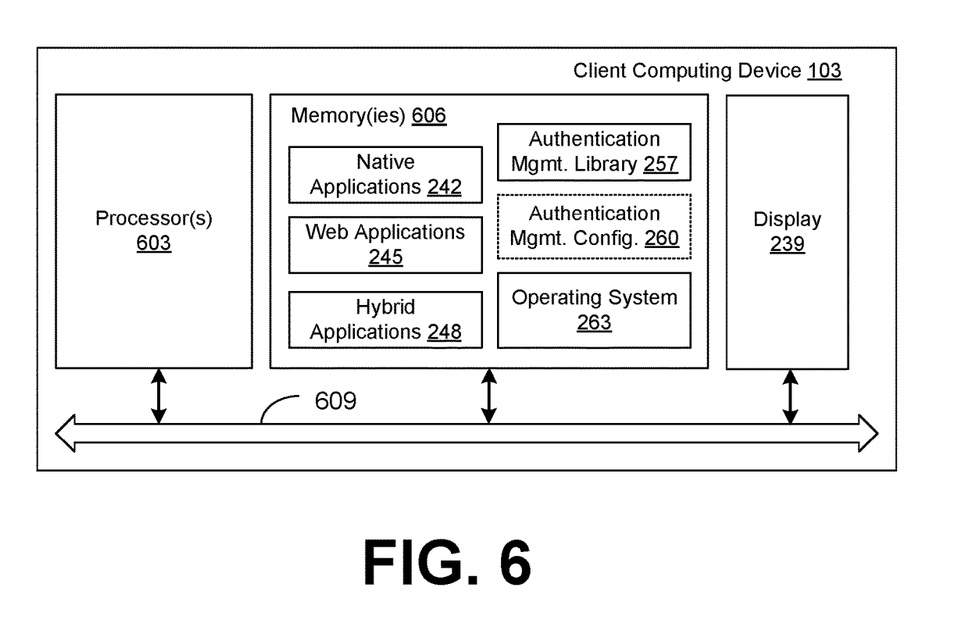
FIG. 6 is a schematic block diagram that provides one example illustration of a client computing device employed in the networked environment of FIG. 2 according to various embodiments of the present disclosure.

With reference to FIG. 6, shown is a schematic block diagram of the client computing device 103 according to an embodiment of the present disclosure. The client computing device 103 includes at least one processor circuit, for example, having a processor 603 and a memory 606, both of which are coupled to a local interface 609. The local interface 609 may comprise, for example, a data bus with an accompanying address/control bus or other bus structure as can be appreciated. A display 239 may also be coupled to the local interface 609.

Stored in the memory 606 are both data and several components that are executable by the processor 603. In particular, stored in the memory 606 and executable by the processor 603 may be the native applications 242, the web applications 245, the hybrid applications 248, the authentication management library 257, and potentially other applications. Also stored in the memory 606 may be an authentication management configuration 260 and other data. In addition, an operating system 263 may be stored in the memory 606 and executable by the processor 603.

Referring now to both FIGS. 5 and 6, it is understood that there may be other applications that are stored in the memories 506, 606 and are executable by the respective processors 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memories 506, 606 and are executable by the respective processors 503, 603. In this respect, the term "executable" means a program file that is in a form that can ultimately be run by the processors 503, 603. Examples of executable programs may be, for example, a compiled program that can be translated into machine code in a format that can be loaded into a random access portion of the memories 506, 606 and run by the processors 503, 603, source code that may be expressed in proper format such as object code that is capable of being loaded into a random access portion of the memories 506, 606 and executed by the processors 503, 603, or source code that may be interpreted by another executable program to generate instructions in a random access portion of the memories 506, 606 to be executed by the processors 503, 603, etc. An executable program may be stored in any portion or component of the memories 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506, 606 are defined herein as including both volatile and nonvolatile memory and data storage components. Volatile components are those that do not retain data values upon loss of power. Nonvolatile components are those that retain data upon a loss of power. Thus, the memories 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 503, 603 may each represent multiple processors 503, 603 and/or multiple processor cores and the memories 506, 606 may each represent multiple memories 506, 606 that operate in parallel processing circuits, respectively. In such a case, the local interfaces 509, 609 may be appropriate networks that facilitate communication between any two of the multiple processors 503, 603, between any processor 503, 603 and any of the memories 506, 606, or between any two of the memories 506, 606, etc. The local interfaces 509, 609 may comprise additional systems designed to coordinate this communication, including, for example, performing load balancing. The processors 503, 603 may be of electrical or of some other available construction.

Although the authentication service 215, the token exchange service 218, the token validation service 221, the network page server 224, the network service 227, the native applications 242, the web applications 245, the hybrid applications 248, the authentication management library 257, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-4 show the functionality and operation of an implementation of portions of the authentication management library 257 and the token exchange service 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowcharts of FIGS. 3A-4 depict a specific order of execution, it is understood that the order of execution may differ from that which is depicted. For example, the order of execution of two or more blocks may be scrambled relative to the order shown. Also, two or more blocks shown in succession in FIGS. 3A-4 may be executed concurrently or with partial concurrence. Further, in some embodiments, one or more of the blocks shown in FIGS. 3A-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 215, the token exchange service 218, the token validation service 221, the network page server 224, the network service 227, the native applications 242, the web applications 245, the hybrid applications 248, and the authentication management library 257, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device; and
    a token exchange service executed in the at least one computing device, wherein when executed the token exchange service is configured to at least:
        receive a first authentication token from a client computing device, the first authentication token being a registration token of an application of the client computing device, the application being registered for accessing a user account for an indefinite time period;

validate the first authentication token;
generate a second authentication token that is a browser-based session token for the user account; and
send the second authentication token to the client computing device, the second authentication token providing a browser of the client computing device temporary access to the user account during a session.

2. The system of claim 1, wherein the second authentication token is generated in a format specified by the client computing device.

3. The system of claim 1, wherein when executed the token exchange service further causes the at least one computing device to at least determine that the first authentication token has not expired and has not been revoked.

4. The system of claim 1, wherein when executed the token exchange service further causes the at least one computing device to at least:
decrypt at least a portion of the first authentication token; and
determine that the portion of the first authentication token corresponds to a correct identifier associated with the user account.

5. The system of claim 1, wherein the first authentication token is configured with an indefinite maximum lifetime, and the second authentication token is configured with a predetermined maximum lifetime.

6. The system of claim 1, wherein the token exchange service is operated by a first organization that is different from a second organization that operates a service provider that provides the user account, and the first organization is trusted by the second organization.

7. The system of claim 1, wherein the first authentication token is configured with a first level of permissions, and the second authentication token is configured with a second level of permissions that is less than the first level of permissions.

8. The system of claim 1, wherein the first authentication token is received from a native application executed by the client computing device, and the browser is embedded within the application.

9. A method, comprising:
receiving, by a token exchange service executed via at least one of one or more computing devices, a first authentication token from a client computing device, the first authentication token being a registration token of an application of the client computing device, the application being registered for accessing a user account for an indefinite time period;
validating, by the token exchange service, the first authentication token;
generating, by the token exchange service, a second authentication token that is a browser-based session token for the user account; and
sending, by the token exchange service, the second authentication token to the client computing device, the second authentication token providing a browser of the client computing device temporary access to the user account during a session.

10. The method of claim 9, wherein generating the second authentication token further comprises generating, by the token exchange service, the second authentication token in a format specified by the client computing device.

11. The method of claim 9, further comprising determining, via at least one of the one or more computing devices, that the first authentication token has not expired and has not been revoked.

12. The method of claim 9, further comprising:
decrypting, by the token exchange service, at least a portion of the first authentication token; and
determining, by the token exchange service, that the portion of the first authentication token corresponds to a correct identifier associated with the user account.

13. The method of claim 9, wherein the first authentication token is configured with an indefinite maximum lifetime, and the second authentication token is configured with a predetermined maximum lifetime.

14. The method of claim 9, wherein the token exchange service is operated by a first organization that is different from a second organization that operates a service provider that provides the user account, and the first organization is trusted by the second organization.

15. The method of claim 9, wherein the first authentication token is configured with a first level of permissions, and the second authentication token is configured with a second level of permissions that is less than the first level of permissions.

16. A system, comprising:
at least one computing device; and
a token exchange service executed in the at least one computing device, wherein when executed the token exchange service is configured to at least:
receive a first authentication token from a client computing device, the first authentication token being a registration token of an application of the client computing device, the application being registered for accessing a user account for an indefinite time period;
receive a specification for a second authentication token from the client computing device, the second authentication token providing a browser of the client computing device temporary access to the user account during a session;
determine that the first authentication token is invalid; and
refrain from generating the second authentication token.

17. The system of claim 16, wherein the specification indicates a browser-based session token format.

18. The system of claim 16, wherein the specification indicates a level of permissions for the second authentication token that is lower than that of the first authentication token.

19. The system of claim 16, wherein determining that the first authentication token is invalid further comprises determining that the first authentication token does not include a correct customer identifier.

20. The system of claim 16, wherein determining that the first authentication token is invalid further comprises determining that the first authentication token has been revoked or is expired.

* * * * *